Figure 8:
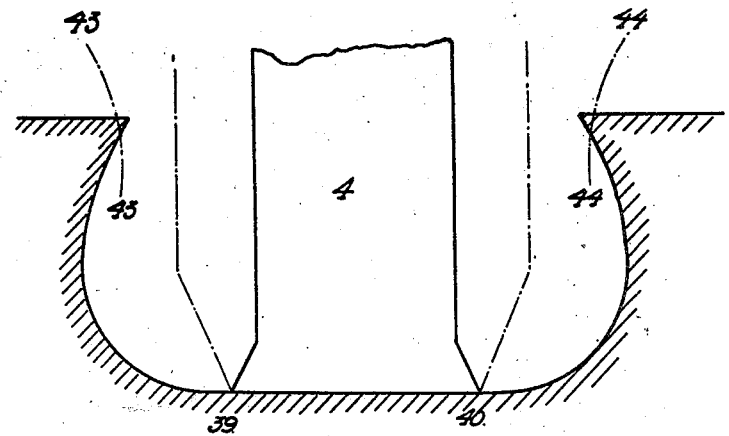

July 18, 1933.  C. O. J. MONTELIUS  1,918,861
METHOD OF MANUFACTURING SCREWS
Filed March 20, 1930  3 Sheets-Sheet 1
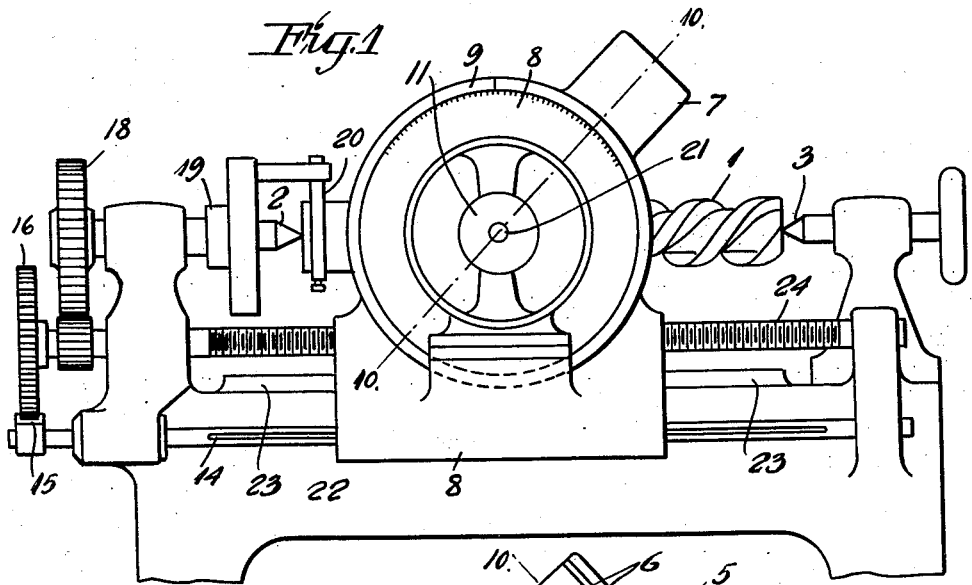
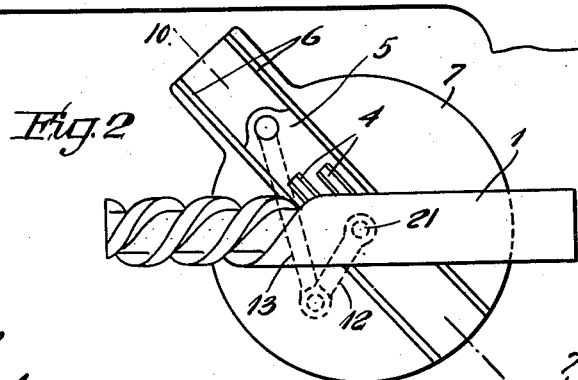
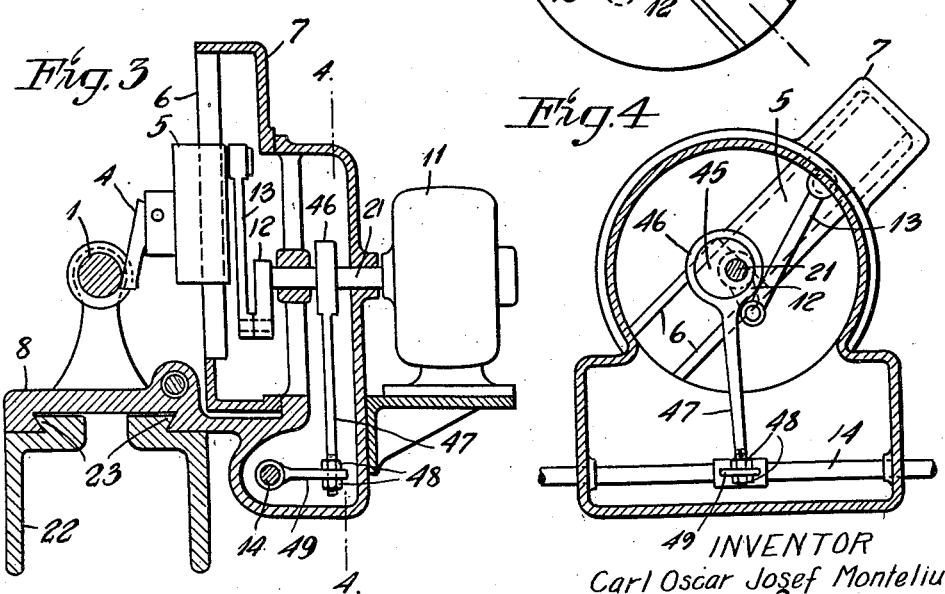
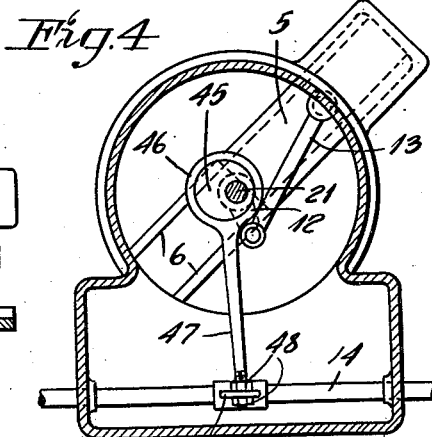
INVENTOR
Carl Oscar Josef Montelius
by
Attorney July 18, 1933.  C. O. J. MONTELIUS  1,918,861
METHOD OF MANUFACTURING SCREWS
Filed March 20, 1930   3 Sheets-Sheet 2
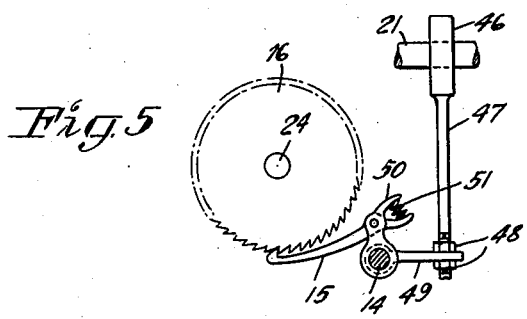
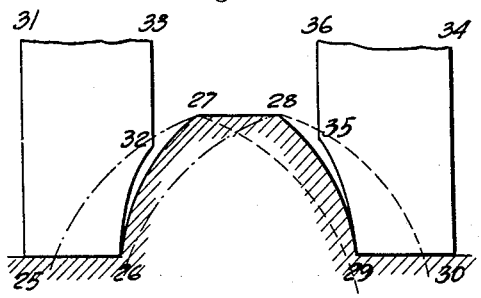
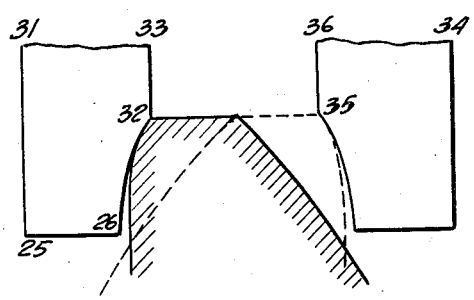
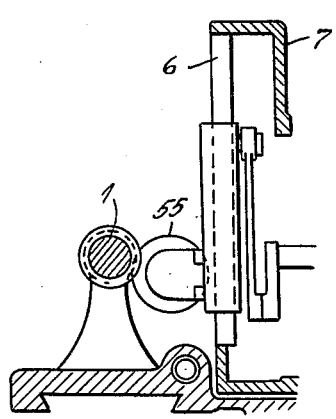
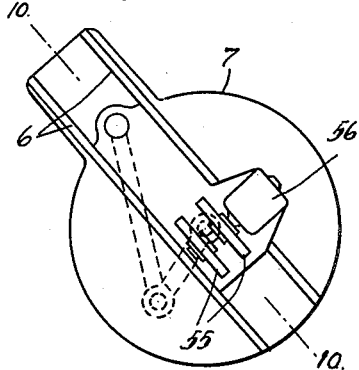
INVENTOR
Carl Oscar Josef Montelius
by
Attorney July 18, 1933.  C. O. J. MONTELIUS  1,918,861
METHOD OF MANUFACTURING SCREWS
Filed March 20, 1930  3 Sheets-Sheet 3

INVENTOR
Carl Oscar Josef Montelius
by
Attorney

Patented July 18, 1933

1,918,861

UNITED STATES PATENT OFFICE

CARL OSCAR JOSEF MONTELIUS, OF STOCKHOLM, SWEDEN, ASSIGNOR TO AKTIEBOLAGET IMOINDUSTRIE, OF STOCKHOLM, SWEDEN, A CORPORATION OF SWEDEN

METHOD OF MANUFACTURING SCREWS

Application filed March 20, 1930, Serial No. 437,411, and in Germany March 22, 1929.

This invention relates to a method of exactly cutting the threads of screws of the kind described in for example the U. S. A. Patent No. 1,698,802. This is a difficult process, especially the making of the screws having helicoidal surfaces of concave shape and great lead angle. My invention describes a simple method of manufacturing such screws rendering it possible to cut them to the exact shape in a non-expensive way.

The main feature of my invention consists in the cutting of the helicoidal surfaces of the work by a tool that is moved along a straight line at an angle to the axis of the work. The lead of the screw is obtained as usual by turning the work around its axis and at the same time moving it proportionally along its axis, or inversely moving the tool holder along the axis of the work.

The accompanying drawings show an embodiment of the invention. Figure 1 is a side elevation of the machine adapted for this process of manufacturing. Figure 2 is a side elevation of part of this machine and the work, both viewed from the opposite side. Figure 3 is a sectional end view of the machine, Figure 4 a section taken on line 4—4 of Figure 3. Figure 5 is an end view of part of the machine including members for the movement of the feeding spindle of the carriage. Figures 6 to 9 are sectional views on an enlarged scale of the work taken on its axis, and parallel to said axis respectively, with the tools in different positions. Figs. 10 and 11 show the application of grinding disks instead of cutting tools.

The work 1 is held between two pointed centers 2 and 3 (Fig. 1). Two tools 4, Fig. 2, are attached to a tool holder 5 that is movable along two guides 6. These guides 6 are parts of a plate 7 which may be turned around the axis 21 and fixed at an exact position. With the aid of an index 9 it is possible to adjust the position 10—10 of the guides 6 to a predetermined angle (Fig. 1). For every kind of screws, the plate 7 (Figs. 1 and 2) is fixed on a carriage 8 at a corresponding angle position 10—10. The carriage 8 is attached to a bed 22 and may be moved by a feeding spindle 24 along ways 23. A motor 11 turns a crank 12 and in this way the sliding tool holder 5 is moved along the guides 6 by a connecting rod 13, giving the tools 4 a straight line movement along the line 10—10. The shaft 21 of the motor also rotates an eccentric 45, giving an eccentric ring 46 and the connecting rod 47 attached to it a small movement forwards and backwards. The other end of this connecting rod 47 passes through a hole in a lever 49 and governs this lever 49 through the nuts 48 attached to the rod. The lever 49 slides along a spindle 14 and follows the movement of the carriage 8. The lever 49 runs on a key fixed in a slot cut in the spindle 14. The shaft 21 turns the eccentric disk 45 and gives by means of the connecting rod 47 and the lever 49 a slight turning movement to the spindle 14 forwards and backwards. Another lever 50 is attached to one end of this spindle 14 and follows the movements of the spindle. A small pawl 15 is attached to the lever 50 and pressed with a spring 51 against a ratchet wheel 16. In this way the ratchet wheel 16 is rotated in small increments when the eccentric disk 46 is moving downwards or when the tool holder 5 is moving upwards. The tools 4 are so arranged that they cut only when moving downwards and the ratchet wheel is accordingly rotated in the meantime between two consecutive cuts of the tool. The ratchet wheel 16 is directly connected to the lead-screw 24 which gives the carriage 8 a certain lengthwise movement. The ratchet wheel 16 is also by means of gears 17 and 18 connected to the head stock spindle and the face plate 19 is connected to the work 1 by means of a dog 20. At every displacement of the ratchet wheel 16 the work 1 is accordingly rotated. The rotation of the work 1 and the lengthwise movement of the carriage 8 are both made in small increments and take place simultaneously when the tool 4 has a return movement between two consecutive cuts.

The Figures 6 and 7 are two longitudinal sections through a screw with convex surfaces. The hatched surface 25—26—27—28—29—30 in Fig. 6 is an axial section through the screw thread. The tool, which in this case is divided in two parts, is shown by the lines 31—25—26—32—33 and 34—30—29—35—36. In this position the tools cut the work along the straight edges 25—26 and 29—30 and also along the curved edges 26—32 and 29—35 in the neighbourhood of the points 26 and 29. In other positions of the tools other parts of the edges cut the work and in the position shown in Fig. 7, which is a section through the work parallel to the axial section in Fig. 6 and corresponds to the end positions of the tools, only one of the tools 31—25—26—32—33 cuts the work in the neighbourhood of the point 32. Also in Fig. 7 the work is shown as previously by a hatched surface. The screw surface between the points 26 and 27, Fig. 6, is accordingly cut by the tool after this tool has passed the axial section in Fig. 6. The other screw surface 28—29, corresponding to the former, is cut in a similar way when the other tool 34—30—29—35—36 passes from its first end position (where the screw thread is shown as a dashed line), Fig. 7, in which the point 35 touches the screw surface, onto the middle position, Fig. 6, where the tool touches the work in point 29.

Figure 9:
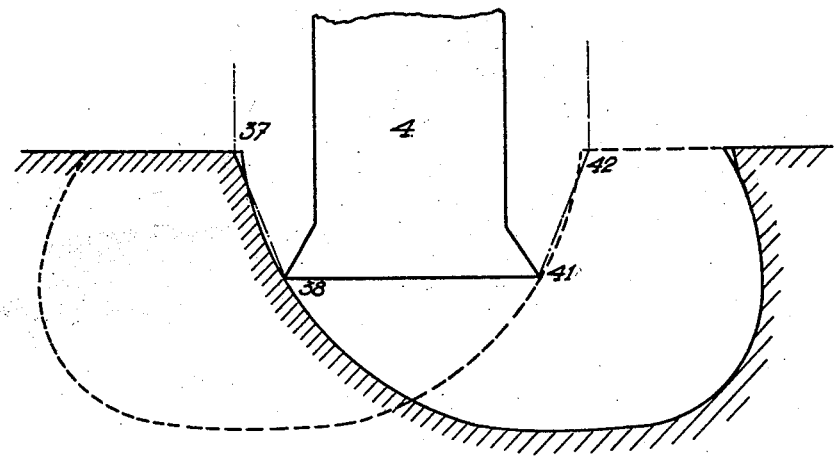

The conditions are similar when cutting the screws with concave surfaces as shown in Figs. 8 and 9. The tool 4, Fig. 9, begins by cutting the work at the point 37 and the edge of the tool passes the position shown in Fig. 9, where it cuts the work only in the point 38 to the middle position shown in Fig. 8. In this middle position the straight edge 39—40 cuts the bottom of the screw groove. In the following positions after passing the middle position, the point 40 in Fig. 8 cuts the other surface of the screw thread. One position is shown in Fig. 9, where the curved dotted line shows a section through the screw parallel to the other sections in Figs. 8 and 9 and showing a position, where the tool cuts only in point 41.

The advantages of this manufacturing process are considerable. The tools are extremely simple and cheaply made. It is easy to regulate the depth of the cut as well as its width. In a single cut both the surfaces of one screw groove or screw thread as well as its bottom are exactly cut and when a double thread screw or a screw with several threads is to be made, all the threads may be cut at the same time. The greatest advantage is, however, that also the screws with concave surfaces and great lead angles may be manufactured by this method.

In Figs. 8 and 9 the straight dashed and dotted lines show another type of tool, where the outside edges 37 of the screw surface are cut at the same time as the screw surface itself. This cutting of the screw surface edge is made when the tools are in the neighbourhood of the position shown in Fig. 9 and the surface cut in the neighbourhood of the edge is given a shape similar to that of a spiral gear face. By this method it is possible to give two screws such a shape that they work together without friction as shown in the Patent No. 1,821,523. The rounded surface along the edge cut in the neighbourhood of the position shown in Fig. 9 is shown in Fig. 8 through the dotted lines 43—43 and 44—44, respectively. When the cutting edges 37—38 and 41—42, respectively, are straight and obtain a certain position and angular direction, it is possible to give the rounded surfaces 43—43 and 44—44 exactly the correct shape of a spiral gear face necessary to allow them to work without friction against the convex screws shown in Figs. 6 and 7.

The tool 4 may be replaced by a rotary milling tool or grinding disk. As shown in Figs. 10 and 11 it is for example possible to work hardened steel screws through rotating grinding wheels 55. Said wheel is driven by a small motor 56 and placed just in the same position as is the tool 4 shown in Fig. 3 on the moving cross head 5. In such case the rotation of the work as well as the feeding motion may be continuous.

What I claim as new and desire to secure by Letters Patent of the United States of America is:—

1. The method of generating screws having helicoidal surfaces, the transverse sections of which are cycloidal, including cutting the work by successive movements of a tool in straight lines in directions tangent to the desired helicoidal surfaces, while turning the work and shifting it axially with respect to the tool between successive cuts.

2. The method of generating screws having helicoidal surfaces, the transverse sections of which are cycloidal, including cutting the work by successive movements of a tool in straight lines in directions tangent to the desired helicoidal surfaces, while turning the work and shifting it axially with respect to the tool between successive cuts, said tool having a portion adapted to cut cylindrical bottoms of the thread grooves during said straight line movements.

3. The method of generating screws having convex helicoidal surfaces, the transverse sections of which are cycloidal, including cutting the work by successive movements of a tool in straight lines in directions tangent to the desired helicoidal surfaces, while turning the work and shifting it axially with respect to the tool between successive cuts, said tool having a curved portion arranged to shape the desired convex helicoidal surface during said straight line movements.

4. The method of generating screws having concave helicoidal surfaces, the transverse sections of which are cycloidal, including cutting the work by successive movements of a tool in straight lines in directions tangent to the desired helicoidal surfaces, while turning the work and shifting it axially with respect to the tool between successive cuts, said tool having a cutting portion arranged to shape the desired concave helicoidal surface during said straight line movements.

5. The method of generating screws having concave helicoidal surfaces, the transverse sections of which are cycloidal, including cutting the work by successive movements of a tool in straight lines in directions tangent to the desired helicoidal surfaces, while turning the work and shifting it axially with respect to the tool between successive cuts, said tool having a cutting portion arranged to shape the desired concave helicoidal surface during said straight line movements, and said tool being also formed to shape the edge of a thread substantially as a spiral gear face during said straight line movements.

CARL OSCAR JOSEF MONTELIUS.